United States Patent
Bähr et al.

(10) Patent No.: US 10,125,890 B2
(45) Date of Patent: Nov. 13, 2018

(54) POLE TUBE FOR ELECTROMAGNETS AND MAGNETIC VALVES, AND METHOD AS WELL AS APPARATUS FOR ITS MANUFACTURE

(71) Applicant: Rausch & Pausch GmbH, Selb (DE)

(72) Inventors: Sebastian Bähr, Gefell (DE); Rocco Kemnitz, Bobenneukirchen (DE)

(73) Assignee: Rausch & Pausch GmbH, Selb (DE)

( * ) Notice: Subject to any disclaimer, the term of this patent is extended or adjusted under 35 U.S.C. 154(b) by 0 days.

(21) Appl. No.: 15/440,240

(22) Filed: Feb. 23, 2017

(65) Prior Publication Data
US 2017/0241562 A1    Aug. 24, 2017

(30) Foreign Application Priority Data
Feb. 23, 2016   (DE) .......................... 10 2016 103 168

(51) Int. Cl.
*H01F 3/00*   (2006.01)
*F16K 31/06*  (2006.01)
(Continued)

(52) U.S. Cl.
CPC ........... *F16K 31/0675* (2013.01); *H01F 5/02* (2013.01); *H01F 7/081* (2013.01); *H01F 7/127* (2013.01);
(Continued)

(58) Field of Classification Search
CPC ...... F16K 31/0675; F16K 31/02; F16K 31/08; H01F 7/1607; H01F 5/02; H01F 3/00
(Continued)

(56) References Cited

U.S. PATENT DOCUMENTS

| | | | | |
|---|---|---|---|---|
| 3,833,015 A | * | 9/1974 | Kneuer | ............... F16K 31/0651 |
| | | | | 137/334 |
| 3,851,285 A | * | 11/1974 | Rothfuss | ................. F16H 61/00 |
| | | | | 251/129.15 |

(Continued)

FOREIGN PATENT DOCUMENTS

| | | |
|---|---|---|
| DE | 3801654 A1 | 7/1989 |
| DE | 10 2006 015 070 A1 | 7/2007 |

(Continued)

OTHER PUBLICATIONS

European Search Report dated Sep. 15, 2017, in connection with corresponding EP Application No. 17 15 6978 (3 pgs.).

*Primary Examiner* — Shawki S Ismail
*Assistant Examiner* — Lisa Homza
(74) *Attorney, Agent, or Firm* — Maier & Maier, PLLC

(57) ABSTRACT

The invention relates to a method for manufacturing a pole tube, with two magnetic pole tube parts, for an electromagnet, in particular for a magnetic valve of an automatic transmission in an automobile, including the following steps: (a) arranging the pole tube parts on a centering arbor; and (b), connecting, in particular insert molding and/or casting an outer lateral surface of the pole tube parts; wherein the centering arbor has a radially expandable cylinder surface also closed even in the expanded state. Further, the invention relates to, in particular with the method obtainable, a pole tube, an electromagnet for a magnetic valve, in particular for an automatic transmission in an automobile, having a pole tube according to the invention, and an apparatus for the manufacture of the pole tube.

9 Claims, 5 Drawing Sheets

(51) Int. Cl.
*H01F 5/02* (2006.01)
*H01F 7/16* (2006.01)
*H01F 7/08* (2006.01)
*H01F 7/127* (2006.01)
*H01F 7/128* (2006.01)

(52) U.S. Cl.
CPC ........... *H01F 7/128* (2013.01); *H01F 7/1607* (2013.01); *H01F 2007/085* (2013.01)

(58) Field of Classification Search
USPC ........................................................ 335/281
See application file for complete search history.

(56) References Cited

U.S. PATENT DOCUMENTS

| | | | | | |
|---|---|---|---|---|---|
| 4,161,306 | A * | 7/1979 | Brune | ................ | F02M 51/0614 251/129.15 |
| 4,262,877 | A * | 4/1981 | Lang | ................... | F16K 31/0658 251/129.15 |
| 4,376,449 | A * | 3/1983 | Nelson | ................. | F04B 17/046 137/391 |
| 4,496,287 | A * | 1/1985 | Nelson | ................. | F04B 17/046 417/417 |
| 4,904,441 | A * | 2/1990 | Sorensen | ................ | G21B 1/19 264/0.5 |
| 6,158,713 | A * | 12/2000 | Ohya | ................. | F16K 31/0679 137/870 |
| 6,362,718 | B1 * | 3/2002 | Patrick | .................... | H01F 29/14 336/214 |
| 6,397,891 | B1 * | 6/2002 | Neuhaus | ............ | G05D 16/2013 137/625.65 |
| 6,966,338 | B2 * | 11/2005 | Flynn | ........................ | F01L 9/02 137/596.17 |
| 7,137,411 | B2 * | 11/2006 | Golovatai-Schmidt | ..................... | F16K 31/0637 137/625.65 |
| 7,243,680 | B2 * | 7/2007 | Golovatai-Schmidt | ..................... | F01L 1/34 137/596.17 |
| 8,109,487 | B2 * | 2/2012 | Kokubu | .............. | F16K 31/0613 251/129.15 |
| 9,772,045 | B2 * | 9/2017 | Dietel | ................. | F16K 31/0662 |
| 2003/0189183 | A1 * | 10/2003 | Noller | ................ | F02M 51/0614 251/129.21 |
| 2005/0046531 | A1 * | 3/2005 | Moyer | ...................... | F01L 9/04 335/256 |
| 2013/0000502 | A1 * | 1/2013 | Hansson | ............. | F16K 31/0679 101/364 |
| 2014/0166915 | A1 | 6/2014 | Ishibashi et al. | | |
| 2014/0196797 | A1 * | 7/2014 | Dietel | .................... | F16K 27/02 137/15.18 |

FOREIGN PATENT DOCUMENTS

| | | |
|---|---|---|
| DE | 10 2006 015 233 A1 | 10/2007 |
| DE | 10 2010 005 844 A1 | 7/2011 |
| DE | 10 2012 214 620 A1 | 2/2014 |
| DE | 10 2012 214 621 A1 | 2/2014 |
| DE | 10 2012 214 698 A1 | 2/2014 |
| DE | 10 2013 226 619 A1 | 6/2015 |
| WO | 2007/079816 A1 | 7/2007 |
| WO | 2013/064226 A2 | 5/2013 |
| WO | 2014/026790 A1 | 2/2014 |

\* cited by examiner

POLE TUBE FOR ELECTROMAGNETS AND MAGNETIC VALVES, AND METHOD AS WELL AS APPARATUS FOR ITS MANUFACTURE

FIELD

This invention relates in general to electromagnets and magnetic valves. Specifically, the invention relates to a method for manufacturing a pole tube for electromagnets and magnetic valves, said pole tube, an electromagnet having said pole tube as well as an apparatus for manufacturing the pole tube.

BACKGROUND

Pole tubes for electromagnets, in particular for magnetic valves in automatic transmissions in automobiles, are known in one-part as well as multi-part execution. One-part pole tubes, such as described in DE 10 2006 015 233 B4, are advantageous concerning the possibility of a low-friction guiding of the magnetic armature and a small radial air gap to the inner lateral surface of the pole tube. This is enabled by the uninterrupted or gap-free design of the pole tube, whereby the inner lateral surface can be utilized directly as a guiding surface for the armature. For suppressing a magnetic short circuit via the pole tube, said pole tube is usually machined thinner in one place.

For all multi-part pole tubes, the magnetic separation of the pole tube is ensured by a nonmagnetic material. The separation of the pole tube can be integrated in the pole tube by a separate part in the form of a pressed sleeve or, such as described in DE 10 2006 015 070 A1, by a welded nonmagnetic ring. For the multi-part execution of the pole tube, it is advantageous to avoid the magnetic short circuit via the pole tube. In principle, it should thereby be able to attained higher magnetic forces.

FIG. 4 shows a connection, known from DE 10 2013 226 619 A1, of two pole tube halves by means of a nonmagnetic ring and casting with an outer plastic layer serving as a winding carrier for a coil winding. The pole tube 110 consists of a pole core 112, a magnetic tube 114 as well as an intermediate nonmagnetic ring 116 as pole tube parts. In the manufacture, the pole tube parts are slipped on a centering arbor and thus arranged in mutually concentric relationship. Thereafter, an outer lateral surface 120 of the pole tube parts is insert molded, for example with a plastic. FIG. 4 shows the pole tube 110 with the insert-molding layer 122 applied to the outer lateral surface 120.

Due to the diameter tolerances of the pole tube parts, an offset is inevitable between the respectively mutually adjacent pole tube parts at the armature running surface 124 formed at the interior of the pole tube 110. No offset-free inner surface can thus be attained for the pole tube. The radial air gap between armature running surface 124 and a magnetic armature (not shown in FIG. 4) displaceably arranged in the pole tube 110 can therefore not be adjusted arbitrarily small. That is, a non-clamping guiding of the magnetic armature directly or by means of an additional PTFE foil in the pole tube 110 can be ensured only by a correspondingly larger dimensioned radial guiding gap at the expenses of the magnetic force to be attained. To avoid this, the mounted pole tube could be reworked. This is not desirable from an economic point of view. A further disadvantage of a multi-part pole tube with intermediate ring 116 are the associated production and mounting expenses.

SUMMARY

Object of the present invention is to propose a pole tube as well as a method for manufacturing a pole tube with which possibly the advantages of the one-part and two-part execution of a pole tube can be attained while avoiding the disadvantages discussed hereinabove as comprehensively as possible.

The object is achieved respectively with the respective features of one of the independent claims. Further embodiment examples and advantageous developments are defined in the respectively adjoining subclaims.

The features and details which are described in connection with the inventive method for manufacturing a pole tube accordingly hold for the apparatus for manufacturing the pole tube and, of course, also in connection with the inventive pole tube (as well as an electromagnet with such a pole tube) and respectively vice versa. Hence, with regard to the disclosure of the individual aspects, reference is mutually made to avoid repetitions.

The inventive method for manufacturing a pole tube, having two magnetic (i.e. magnetically conductive) pole tube parts, for an electromagnet, in particular for a magnetic valve of an automatic transmission in an automobile, comprises the following steps: (a) arranging the pole tube parts on a centering arbor; (b) connecting, in particular insert molding and/or casting an outer lateral surface of the pole tube parts, preferably with a nonmagnetic (i.e. magnetically non-conductive) material, wherein according to the invention the centering arbor has a radially expandable cylinder surface closed even in the expanded state.

The radially expandable centering arbor can be executed in the manner of an expansion arbor. Here, a radially expandable centering arbor in the context of the invention is understood to be a cylindrical element having a radially expandable cylinder surface which is closed even in the expanded state. This may be an expansion arbor as is known from the field of the machine tools, for example a hydraulic expansion arbor as is known for clamping workpieces in lathes. However, the invention is not restricted to this specific kind of an expansion arbor, but other possibilities for radial clamping from the inside to the outside having a cylinder surface which is closed even in the expanded state can also be used.

The pole tube's structural parts are advantageously a magnetic pole core tube and a magnetic tube which is magnetic. The arrangement of the pole tube's structural parts is effected preferably concentrically to a center longitudinal axis of the pole tube and the radially expandable centering arbor.

The pole core tube can have a pole core or be configured for receiving a pole core or for connecting to a pole core.

The pole tube's core and/or the magnetic tube can preferably be designed with a flange respectively facing away from the pole tube.

For the later receiving of a magnetic armature, both pole tube's structural parts have a through bore which have preferably the same inside diameter. As soon as the pole tube's structural parts are insert molded and/or are cast, both pole tube's structural parts form a magnetic space for receiving the displaceably arranged magnetic armature in the pole tube.

In step (a), the pole tube's structural parts are preferably arranged on the radially expandable centering arbor with a distance apart such that between the pole tube's structural parts in axial direction a gap is formed for magnetically separating the pole tube's structural parts sufficiently.

After step (a), in which the pole tube's structural parts were arranged on the radially expandable centering arbor, follows a step of radially expanding a lateral cylinder surface of the centering arbor. That is, the outer diameter of the centering arbor is enlarged, for example by supplying a corresponding hydraulic pressure in the interior of the centering arbor. It is thereby attained that the gap between the pole tube's structural parts is closed by means of the lateral surface of the centering arbor with the respective inner surfaces of the pole tube's structural parts flush toward the interior of the pole tube. In other words, the radially expandable centering arbor supplies, according to the invention, a radially expandable lateral cylinder surface for the inner-sided offset-free closing of the gap between two gap-forming tubes bordering on each other, namely magnetic tube and pole core tube.

In step (b) the outer lateral surfaces of the pole tube's structural parts are connected permanently by the fact that they are insert molded and/or cast with a nonmagnetic material, which likewise completely fills the gap between the pole tube's structural parts.

Since the lateral surface of the centering arbor adjoins, in an accurately fitting way, the gap-forming inner surfaces of the pole tube's structural parts due to the radial expansion of the centering arbor, there results respectively a planar, i.e. offset-free, transition between the inner surface of the pole tube's structural parts and an inner surface of the nonmagnetic material filling the gap.

Advantageously, due to the perfect centering of the pole tube's structural parts by means of the radial expansion of the centering arbor, possibly existing diameter tolerances between the pole tube's structural parts can be compensated by an offset-free transition between the inner surface of the pole tube's structural parts and the nonmagnetic material filling the gap. That is, by using the radially expandable centering arbor, a nearly tolerance-free alignment of the pole tube's structural parts to each other can be attained and thus a nearly perfectly extending inner surface of the created pole tube.

As a result, the nonmagnetic material filling the gap forms, together with the inner surfaces of the pole tube's structural parts a continuously planar, the inner surface of the pol tube. This makes it possible to dimension the radial air gap correspondingly small between the magnetic armature to be used later and the inner surface of the pole tube. Consequently, an particularly high magnetic force can be generated in an electromagnet or magnetic valve containing the pole tube.

Preferably the pole tube's structural parts are insert molded and/or cast with the nonmagnetic material, for example a plastic, so that the nonmagnetic material can serve as a winding carrier for receiving a coil for the electromagnet to be created.

The casting and/or insert molding creates a form-fitting and force-fitting composite of the entire pole tube structural group, which can be further supported by corresponding contouring of the pole tube's structural parts, for example, a knurling or grooves.

After hardening of the insert molded and/or cast nonmagnetic material, the radial expansion of the centering arbor is eliminated in a step (c). Then the finished pole tube can be taken from the expansion arbor.

If the pole core tube does not already have a pole core, a step (d) can follow step (c) in which a pole core is inserted in the pole core tube at one end of the pole tube.

As a result, the inventive manufacturing method creates a pole tube which is nearly perfect in terms of the running errors for a magnetic armature in the magnetic space of the pole tube.

This makes it possible primarily to adjust the air gap particularly small between a magnetic armature and the pole core, i.e. the radial air gap in the plunger step formed by the pole core tube and the radial air gap between a movable magnetic armature and the magnetic tube, the additional air gap. Particularly high magnetic forces can be realized with a pole tube manufactured by the inventive manufacturing method with particularly small radial air gap in the plunger step as well as in the additional air gap.

Likewise, a low-friction bearing of a magnetic armature can be attained in the pole tube because the magnetic transverse forces can be nearly avoided due to eccentricities of the pole tube's structural parts in the prior art, and no offset can occur respectively in the transitions between the pole tube's structural parts which could hinder the armature motion.

Finally, a reworking of the armature running surfaces limiting the magnetic space is omitted, because no thermal tenseness is brought about in the pole tube's structural parts in contrast to connecting the pole tube's structural parts by means of a thermal joining method, for example by welding or soldering.

A second aspect of the present invention relates to a pole tube for an electromagnet, in particular for a magnetic valve of an automatic transmission in an automobile. In the pole tube, a nonmagnetic (i.e. magnetically non-conductive) material axially fills according to the invention a gap between two, preferably magnetic structural parts (i.e. magnetically conductive) of the pole tube. The pole tube's structural parts are arranged in a mutually concentric relationship. An outer lateral surface of the pole tube's structural parts is cast or insert molded with the nonmagnetic material, in particular with a plastic, wherein the nonmagnetic material together with the pole tube's structural parts configures a continuous planar inner surface of the pole tube.

The inventive pole tube is obtainable by a manufacture by means of the hereinabove discussed inventive manufacturing method according to the first aspect of the invention.

Preferably the magnetic tube and the pole core tube are manufactured from a magnetically conducting ironworks substance, for example by machining (e.g. 1.0715), or as a sintered part (e.g. Sint D35) or as a extruded part (e.g. 1.0303).

Preferably the nonmagnetic material is a plastic, e.g. PA 6.6 GF30.

Preferably an inner surface of the pole tube formed by the nonmagnetic material in the gap and respectively the inner surface of an adjacent pole tube's structural part have the same inside diameter at the respective transitions. In other words, the transitions between the inner surfaces of the pole tube's structural parts and the inner surface of the nonmagnetic material filling the gap transition into each other without offset.

Preferably one of the pole tube's structural parts at one end of the pole tube has a pole core or is connected, particularly preferably by joining, with the pole core, for example by pressing.

A third aspect of the invention concerns an electromagnet for a magnetic valve, in particular for automatic transmission in an automobile, which has a pole tube according to the second aspect of the invention.

For this electromagnet there preferably is arranged a bearing foil, for example a PTFE foil or a plastic foil or a plastic-glass tissue, between the pole tube and a lateral surface of a magnetic armature. The bearing foil prevents a unilateral placing of the armature against the magnetic tube or the pole core tube and thus reduces magnetic transverse forces and associated unwanted friction effects.

Preferably a coil, in particular a copper wire winding, is arranged around the nonmagnetic material surrounding the pole tube, which is shaped as a winding carrier.

Finally, the fourth aspect of the invention relates to an apparatus for manufacturing a pole tube, having two magnetic pole tube parts, for an electromagnet, in particular for a magnetic valve of an automatic transmission in an automobile, comprising: a centering arbor for arranging the pole tube parts; and an injection mold which can enclose the pole tube parts arranged on the centering arbor to connect an outer lateral surface of the pole tube parts by insert molding and/or casting by means of an injection molding or casting material. The centering arbor has a radially expandable cylinder surface according to the invention, which is closed even in the expanded state, in the manner of an expansion arbor. For example, the centering arbor can be executed as hydraulic expansion arbor. The apparatus is further so configured to radially expand the centering arbor before the insert molding and/or casting that in the region of a gap between the pole tube parts, a lateral surface of the centering arbor terminates the gap with the respective adjacent inner surfaces of the pole tube parts planar and/or without offset.

Summing up, it can be ascertained that with the inventive manufacturing method for a pole tube as well as the inventive apparatus for the manufacture of a pole tube, a pole tube with a magnetic separation of the pole tube for an optimal magnetic circuit exploitation can be attained with simultaneous realization of a continuous inner lateral surface for a low-friction guiding of a magnetic armature with a narrow radial air gap. In doing so, the manufacture of the multi-part pole tube is possible in one mounting step, particularly without the need for reworking. Particularly a separate nonmagnetic part can be omitted, for example the intermediate ring known from the prior art discussed at the outset for the magnetically separating the pole tube, thereby avoiding the associated expenses. These advantages are substantially attained by the clamping and centering of the pole tube's structural parts before insert molding on a centering arbor with a radially expandable lateral cylinder surface, which is also terminated in the expanded state, in an injection-molding tool, accordingly equipped with this centering arbor, as an apparatus for manufacturing the inventive pole tube.

Further advantages, features and details of the invention will result from the following description, in which embodiment examples of the individual aspects of the invention will be described in detail with reference to the drawings. The features mentioned in the claims and in the description may be essential to the invention individually per se or in arbitrary combination. Likewise, the hereinabove mentioned features and those specified hereinbelow may be employed each per se or in groups in arbitrary combinations. Functionally similar or identical parts or components are furnished in part with the same reference signs. The terms "left", "right", "above" and "below" employed in the description of the embodiment examples relate to the drawings as oriented with the figure designation or reference signs in the normally legible way. The embodiments shown and described are not to be understood as exhaustive, but have an exemplary character for explaining the invention. The detailed description is for the skilled person's information, so that known circuits, structures and methods are not shown or explained in detail in the description so as not to impede the understanding of the present description. Hereinafter the invention will be described by way of example with reference to the accompanying drawings. There are shown:

DETAILED DESCRIPTION

Figure 1:
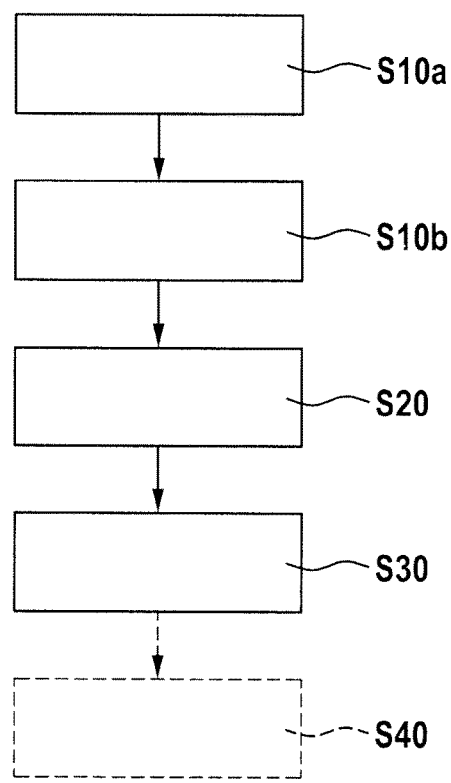
FIG. 1 shows a flowchart of the inventive method for manufacturing an inventive pole tube.

FIG. 1 shows a flowchart as to the method steps shown in FIG. 2. In a first step S10a, pole tube's structural parts are arranged on a hydraulic expansion arbor, which is a possible embodiment of a centering arbor with a radially expandable closed cylinder lateral surface. In FIG. 2(a), a magnetic tube 20, which has a flange 24 at one end forming an end 22 of the pole tube, is arranged on the expansion arbor 10.

Figure 2A:
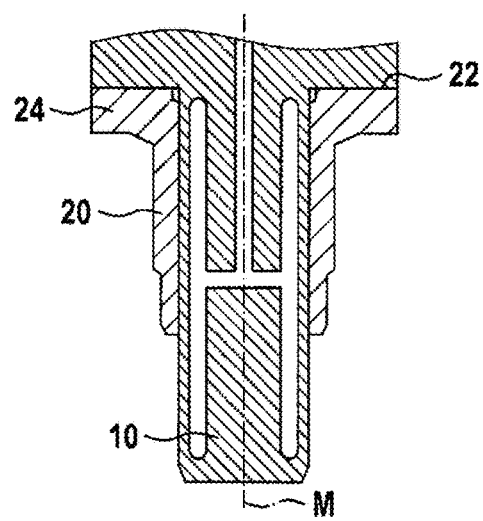
FIG. 2A shows a step in a method for manufacturing an inventive pole tube.
Figure 2B:
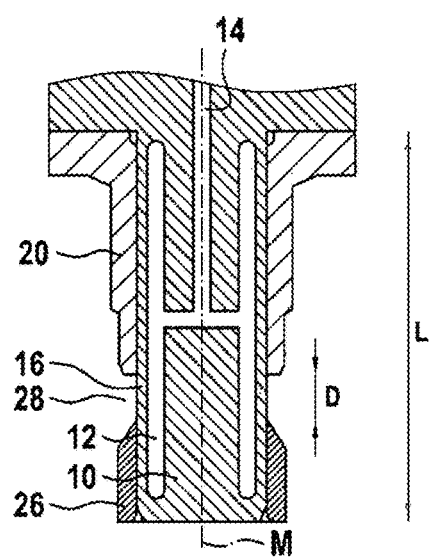
FIG. 2B shows a step in a method for manufacturing an inventive pole tube.

Thereafter, as shown in FIG. 2(b), the second pole tube's structural part, namely a pole core tube 26, is slipped on the expansion arbor 10. It can be readily recognized in FIG. 2(b) that the pole tube's structural parts, namely the magnetic tube 20 and the pole core tube 26, are arranged to each other on the expansion arbor 10 with a distance D. The distance D is so chosen or adjusted that between the pole tube's structural parts 20, 26, a gap 28 is formed sufficient for magnetically separating the pole tube's structural parts. The gap-forming arrangement is step S10b of FIG. 1.

The expansion arbor 10, as a possible embodiment of a centering arbor having a radially expandable cylinder lateral surface closed even in the expanded state, is in principle known concerning its manner of functioning and its construction in the field of the workpiece clamping and tool clamping, and can therefore substantially be constructed like a hydro expansion arbor known there. The expansion arbor 10 shown schematically in FIGS. 2(a) to 2(d) corresponds in its construction and its function to a hydro expansion arbor known for workpiece clamping.

Instead of the expansion arbor 10, a centering arbor having a radially expandable lateral cylinder surface, which is closed even in the expanded state, can of course be employed while the centering arbor can have any other arbitrary setup, as long as the effect of the radially expandable closed cylinder surface required here can be supplied for closing the gap 28 on the inside between two gap-forming adjacent pole tube's structural parts 20, 26.

Inside of the expansion arbor 10 there is a chamber system 12 into which a pressurizing medium, for example a hydraulic oil, can be pressed via a feed line 14, whereby the pressure built up in the pressurizing medium acts substantially against the inner walling of the thin-walled expansion sleeve 16. Consequently, the expansion sleeve 16 expands radially uniformly, centrically and cylindrically to the center axis M corresponding to the pressure fed on the entire clamping length L. Thereby the two pole tube's structural parts 20, 26 are centered to each other by their inner surfaces on the expansion arbor. The expanding of the expansion arbor 10 corresponds to the step S20 in FIG. 1.

In contrast to a centering by means of cone surfaces at an intermediate ring, like in the prior art, here the influence of concentricity tolerances on the later functional inner surfaces is at least minimized, ideally excluded, by means of the clamping. By using the hydraulic expansion arbor 10, the present diameter tolerances between the two pole tube's structural parts are perfectly distributed, ideally compensated, over the entire circumference of the pole tube's structural parts. Additionally, the region forming the gap 28 between the two pole tube's structural parts to the interior of the pole tube to be manufactured is sealed splash-tightly or tightly and delimited planarly by means of the expansion arbor 10.

In the details shown in FIGS. 2(a) to 2(d) of the inventive manufacturing method, in order to facilitate the clamping of the pole tube's structural parts 20, 26 to the expansion arbor 10, a pole core 30 (cf. Figure (d)), where applicable including flange, is joined with the finished pole tube advantageously only after the insert molding. The open construction of the pole tube during manufacture, i.e. with a through bore, allows a central positioning of both pole tube's structural parts on the hydraulic expansion arbor 10.

Figure 2C:
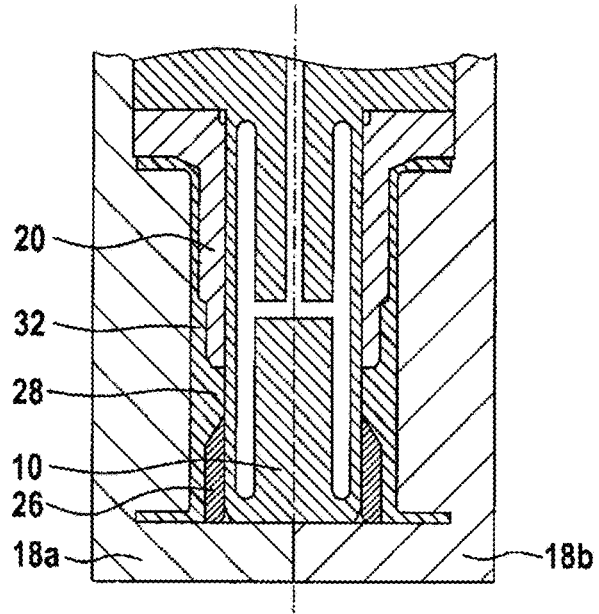
FIG. 2C shows a step in a method for manufacturing an inventive pole tube.

In FIG. 2(c) step S30 of FIG. 1 is illustrated, where the pole tube's structural parts 20, 26 are connected by insert molding of the outer lateral surface of the pole tube's structural parts with a nonmagnetic material, for example a plastic. The nonmagnetic material forms, beside the inner surfaces of the pole tube's structural parts 20, 26, a part of the inner surface of the pole tube in the region of the gap 28. For this purpose, it is represented in FIG. 2(c) that the pole tube's structural parts 20, 26 arranged on the expansion arbor 10 are enclosed by two halves of an injection mold 18a, 18b in such a way that the space formed thereby between the pole tube's structural parts 20, 26, the lateral surface of the expansion arbor 10 in the region of the gap 28 as well as the inner surface of the injection mold parts 18a and 18 has the form of a winding carrier 32. For this purpose, a nonmagnetic material, for example a plastic, is insert molded in a per se known manner into this space in liquid form, and thus the outer lateral surfaces of the pole tube's structural parts 20, 26 are insert molded and/or cast. In this way the pole tube's structural parts 20, 26 are permanently connected.

Figure 2D:
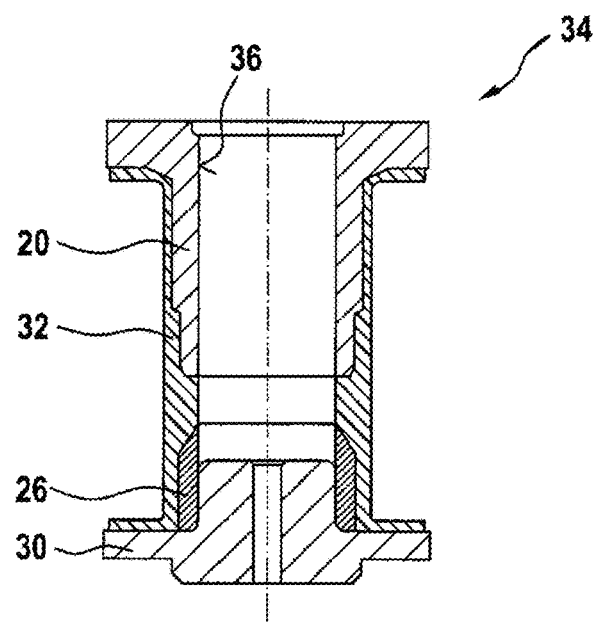
FIG. 2D shows a step in a method for manufacturing an inventive pole tube.

FIG. 2(d) shows the finished pole tube 34, consisting of the magnetic tube 20 and the pole core tube 26, the pole core 30 inserted into pole core tube 26 as well as the insert molded/cast winding carrier 32 connecting the pole tube's structural parts 20, 26. Particularly advantageously there results a nearly offset-free inner surface 36 for the pole tube 34 through the manufacturing method according to the invention.

Preferably the pole tube's structural parts 20, 26 and the pole core 30 are manufactured from a magnetically conducting ironworks substance, for example by machining (e.g. 1.0715), or as a sintered part (e.g. Sint D35) or as a extruded part (e.g. 1.0303). Preferably the nonmagnetic material is a plastic, e.g. PA 6.6 GF30.

Figure 3:
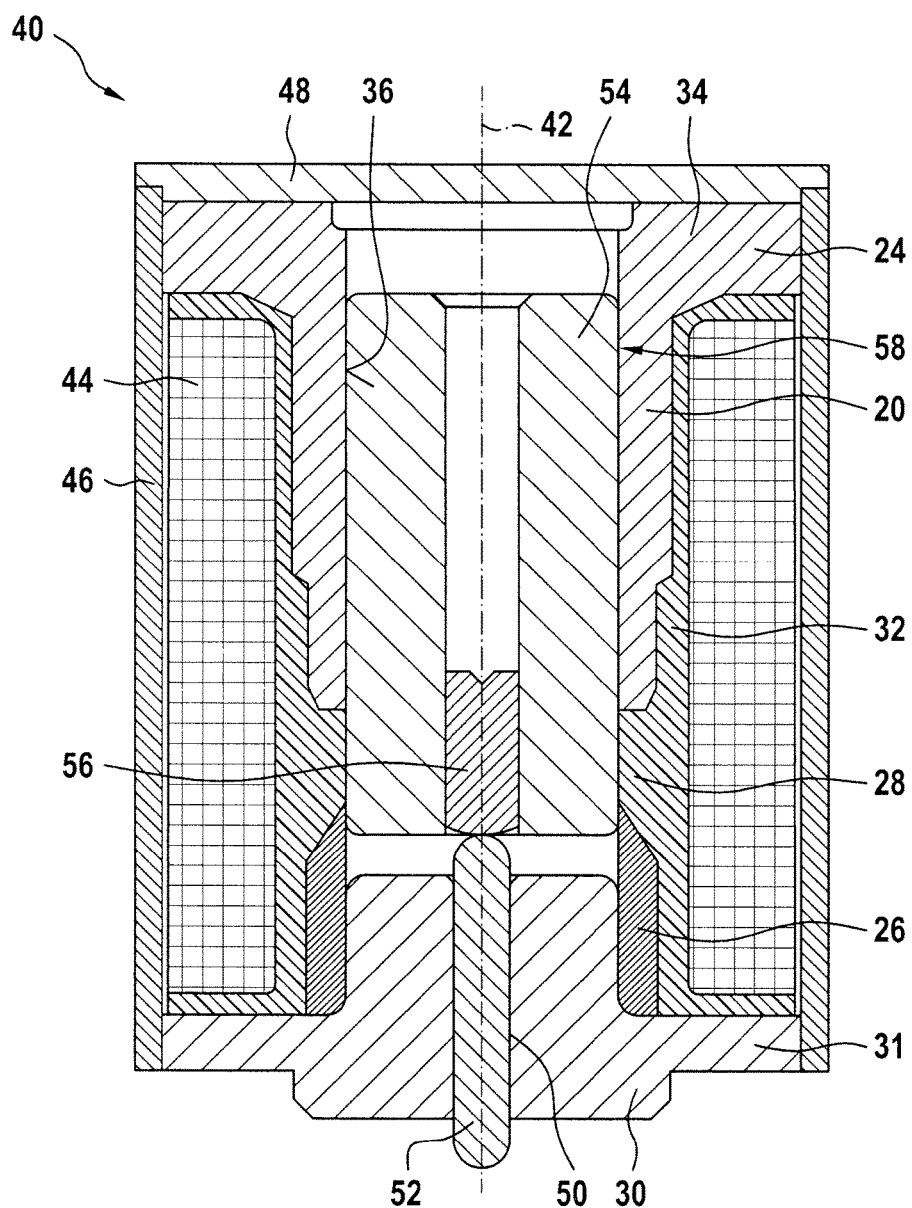
FIG. 3 shows an embodiment of a magnetic valve of an electromagnet according to the invention.
Figure 4:
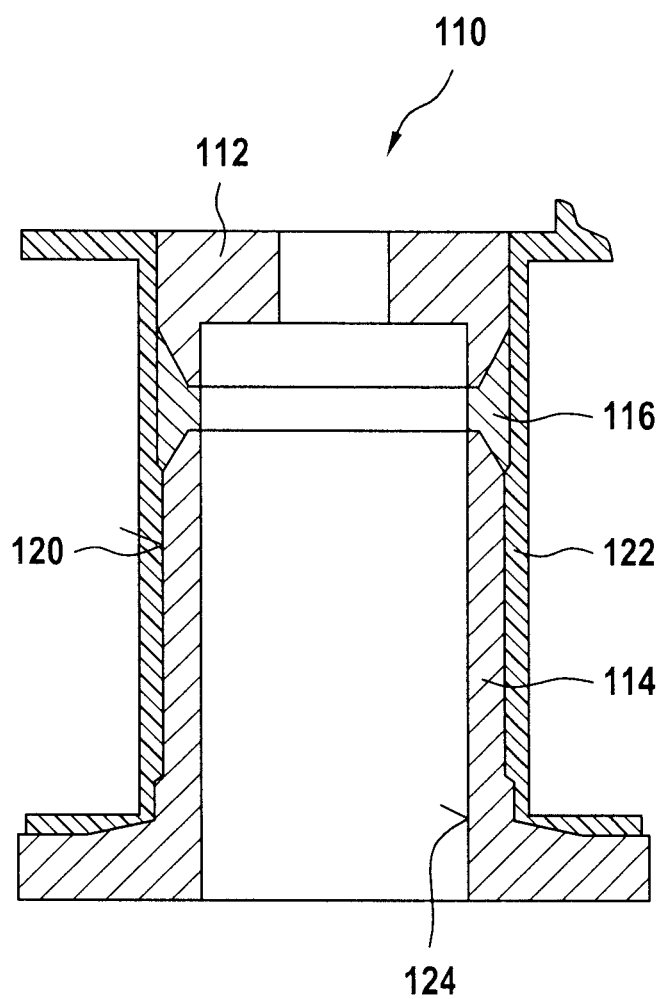
FIG. 4 shows a connection, known from prior art, of two pole tube halves by means of a nonmagnetic ring and casting with an outer plastic layer.

FIG. 3 shows a section through an inventive electromagnet 40 for a magnetic valve with an inventive pole tube 34, which has preferably been manufactured with the inventive manufacturing method of FIGS. 1 and 2.

In the electromagnet 40, the pole tube 34 is arranged concentrically to a center longitudinal axis 42 of the electromagnet 40. As shown in FIG. 2(d), the pole tube 34 consists of the magnetic tube 20, the pole core tube 26 and the pole core 30 inserted therein at one end. The magnetic tube 20, the pole core tube 28 and the pole core 30 are manufactured from a magnetic material.

On the outer lateral surfaces of the pole tube's structural parts 20, 26, an insert molding or casting layer of a nonmagnetic material, preferably plastic, is applied. This insert-molded or cast layer acts as a winding carrier 32 for a coil 44 arranged thereon, for example in the form of a copper wire winding. Outwardly, the winding carrier 32 and the coil 44 supported thereon are enclosed by a cylindrical housing 46 of the electromagnet 40.

On the side of the pole tube 34 having the flange 24, the housing 46 is closed with a cover 48. Opposite of the cover 48, at the other pole tube's end at which the pole core 30 is located, the housing 46 is likewise closed by an element of the pole core 30 forming a flow disk 31.

The pole core 30 has a centric through bore 50, in which an actuation pin 52 is displaceably guided, for example for a valve element. A magnetic armature 54 in the pole tube 34 is mounted on an inner surfaces 36 of the pole tube 34 forming an armature running surface. The actuation pin 52 is actuatable by the magnetic armature 34 or, more precisely, by an armature bolt 56 connected to the magnetic armature 54.

The connection of both pole tube's structural parts 20, 26 by means of the plastic insert molding completely fills the gap 28 provided for the magnetic separation of the pole tube's structural parts. The continuous interior inner surface 36 serving as an armature running surface according to the inventive method is continuous and offset-free so that a guiding of the magnetic armature 54 is possible with minimal radial air gap 58.

Finally, it should be noted that the outer lateral surfaces of the pole tube's structural parts 20, 26 can be furnished with surface structures not shown in the Figures, for example in the form of knurling or grooves, prior to the insert molding to attain a better connection of the pole tube's structural parts 20, 26 with the nonmagnetic material.

For centering the magnetic armature 54 in the pole tube 34 with defined radial air gap 58 between outer lateral surface of the magnetic armature 54 and inner lateral surfaces 36 of the pole tube 34, a bearing foil (not shown in the Figure), for example of PTFE or plastic or a plastic-glass tissue, can be provided between the inner surface 36 of the pole tube 34 and the magnetic armature 54. This avoids a unilateral applying, connected with high magnetic transverse forces, of the magnet armature 54 to the magnetically conducting single parts of the pole tube 34.

The invention claimed is:

1. A method for manufacturing a pole tube, having two magnetic pole tube parts and a center axis, for an electromagnet, the electromagnet comprising a magnetic valve of an automatic transmission in an automobile, comprising the following steps:
(a) arranging the pole tube parts on a centering arbor with a mutual axial distance such that the pole tube parts form a gap sufficient for a magnetic separation, expanding the centering arbor so that in the region of the gap, a lateral surface of the centering arbor closes the gap with a respective inner surface of each of the pole tube parts without any offset; and (b) connecting, by insert molding and/or casting, an outer lateral area of the pole tube parts with a nonmagnetic material so that, together with the pole tube parts, the nonmagnetic material forms the inner surface of the pole tube;

wherein the centering arbor is an expansion arbor with a radially expandable cylinder surface which is closed even in the expanded state.

2. The method according to claim 1, further comprising: inserting a pole core in one of the pole tube parts at one end of the pole tube.

3. A pole tube having a center axis for an electromagnet, the electromagnet comprising a magnetic valve of an automatic transmission in an automobile, comprising a nonmagnetic material that fills a axial gap between two magnetic pole tube parts, wherein the pole tube parts are arranged in a mutually axial and concentric relationship, wherein outer lateral surfaces of the pole tube parts are cast-in or insert-molded with the nonmagnetic material, and wherein together with the pole tube parts the nonmagnetic material forms a planar and offset-free inner surface, so that portions of the inner surface of the pole tube which are formed by the nonmagnetic material in the gap and, respectively, the part of the inner surface of the adjacent pole tube part have an identical inside diameter at each transition between the nonmagnetic material and the adjacent pole tube part.

4. The pole tube according to claim 3, wherein the nonmagnetic material is a plastic.

5. The pole tube according to claim 3, wherein the pole tube parts are manufactured from a magnetically conducting steel material, by machining, or as a sintered part or as an extruded part.

6. The pole tube according to claim 3, wherein one of the pole tube parts has a pole core at one end of the pole tube or is connected, by joining, with a pole core.

7. The electromagnet for a magnetic valve according to claim 3, wherein a coil, in particular a copper wire winding, is arranged on a winding carrier, which is formed by the nonmagnetic material surrounding the lateral surface of the pole tube parts.

8. An apparatus for manufacturing a pole tube, having two magnetic pole tube parts, for an electromagnet, the electromagnet comprising a magnetic valve of an automatic transmission in an automobile, comprising: a centering arbor for arranging the pole tube parts; and an injection mold which can enclose the pole tube parts arranged on the centering arbor to connect the pole tube parts by insert molding and/or casting an outer lateral surface of the pole tube parts by means of an injection molding or casting material;

wherein:
the centering arbor is an expansion arbor with a radially expandable cylinder surface which is closed even in the expanded state, and
the apparatus is configured to radially expand the centering arbor before the insert molding and/or casting so that in the region of a gap between the pole tube parts a lateral surface of the centering arbor terminates the gap flush with the respective adjacent inner surfaces of the pole tube parts.

9. A method of manufacturing the pole tube of claim 3, wherein the method comprises:

(a) arranging the pole tube parts on a centering arbor with a mutual axial distance such that the pole tube parts form the axial gap such that the axial gap has a size sufficient for a magnetic separation, expanding the centering arbor so that in the region of the gap, a lateral surface of the centering arbor closes the gap with a respective inner surface of each of the pole tube parts without any offset; and (b) connecting, by insert molding and/or casting, an outer lateral area of the pole tube parts with the nonmagnetic material so that, together with the pole tube parts, the nonmagnetic material forms the inner surface of the pole tube;

wherein the centering arbor is an expansion arbor with a radially expandable cylinder surface which is closed even in the expanded state.

* * * * *